May 20, 1930.  F. GRAY  1,759,504
ELECTROOPTICAL TRANSMISSION
Filed April 6, 1927  3 Sheets-Sheet 1
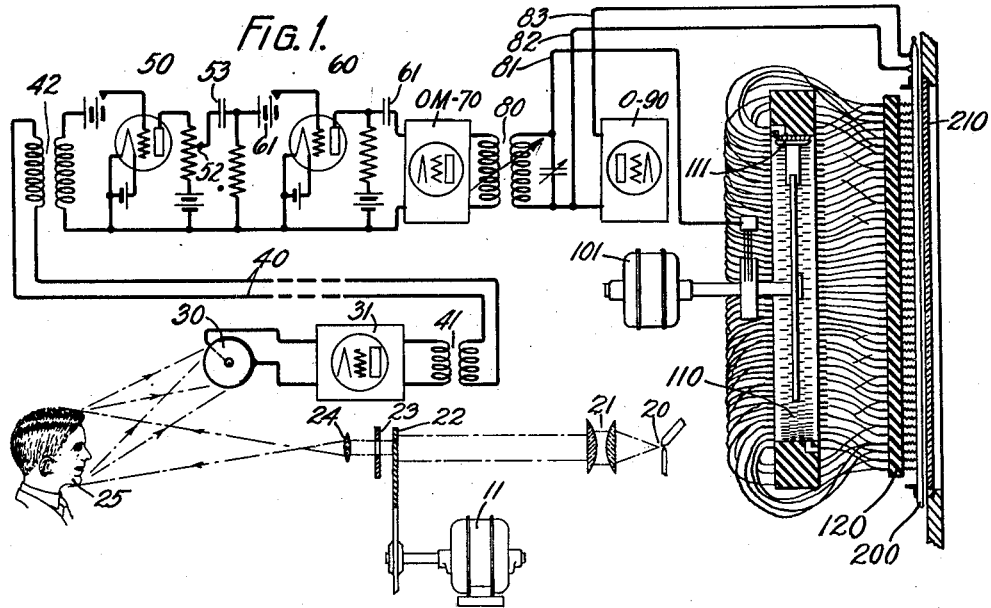
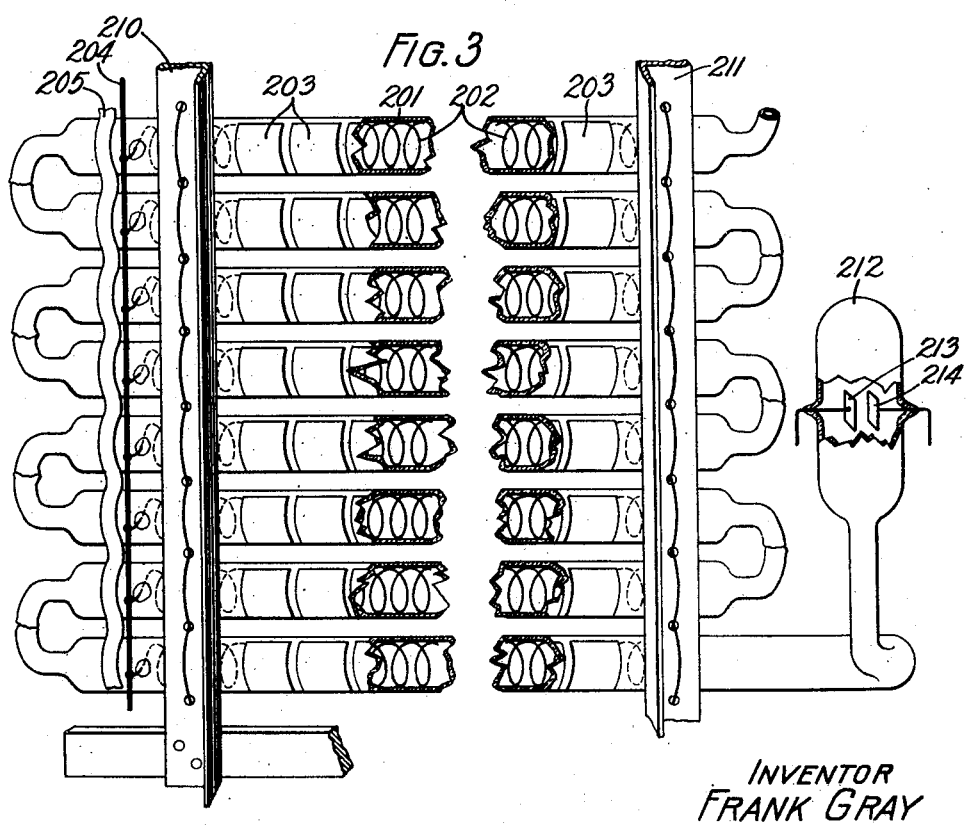
INVENTOR
FRANK GRAY
By
ATTORNEY May 20, 1930.  F. GRAY  1,759,504
ELECTROOPTICAL TRANSMISSION
Filed April 6, 1927   3 Sheets-Sheet 2

INVENTOR
FRANK GRAY
By
ATTORNEY

May 20, 1930.   F. GRAY   1,759,504
ELECTROOPTICAL TRANSMISSION
Filed April 6, 1927   3 Sheets-Sheet 3

INVENTOR
FRANK GRAY
By
ATTORNEY

Patented May 20, 1930

1,759,504

UNITED STATES PATENT OFFICE

FRANK GRAY, OF NEW YORK, N. Y., ASSIGNOR TO BELL TELEPHONE LABORATORIES, INCORPORATED, OF NEW YORK, N. Y., A CORPORATION OF NEW YORK

ELECTROOPTICAL TRANSMISSION

Application filed April 6, 1927. Serial No. 181,537.

This invention relates to electro-optical transmission, and more particularly to image producing apparatus in a television system, the image produced being suitable for audience viewing.

It has heretofore been proposed in television transmission to produce an image at the receiving station by successively illuminating elemental areas of a viewing screen in accordance with the tone values of corresponding elemental areas of an object or picture being scanned at the transmitter. In order to take advantage of the persistence of vision and thus give the effect of a continuous picture on the viewing screen, each elemental area must be illuminated from 15 to 20 times a second. In the heretofore proposed system there is used a glow discharge lamp having a plurality of individual electrodes, one for each elemental area of the viewing screen, and a common electrode cooperating therewith, all sealed in an enclosing transparent vessel containing an inert gas, such as neon at low pressure. The energizing current is supplied to the several electrodes successively at the proper times by a commutating device. Such a system is disclosed in a copending application of H. E. Ives, Serial No. 110,379, filed May 20, 1926.

In accordance with the present invention a simplified lamp arrangement is provided and the simplification is made possible by the use of external electrodes and high frequency excitation of the lamp. The high frequency is preferably supplied at the receiving station so as to permit the image or signal current to be transmitted over a line adapted to transmit only relatively low frequencies.

A feature of the invention is the application to the lamp of a separate high frequency exciting voltage to make the lamp respond more readily to the signal voltages.

Another feature of the invention is the application to the lamp of a suitable amount of carrier current to produce illumination equivalent to the average illumination of the field at the transmitter independently of the amplitudes of the incoming image currents.

An arrangement embodying the present invention, specifically stated, comprises a multiple electrode viewing lamp, a source of high frequency energy adapted to be modulated by received picture current, and a distributor for connecting the output circuit of the high frequency source to the several electrodes of the lamp in the proper sequence. The lamp comprises a plurality of sections of glass tubing arranged side by side and joined together at the ends to form a continuous tube. The tube is filled with a suitable gas, such as neon, at a low pressure suitable for causing a glow discharge. Individual small electrodes are fixed to the exterior of one side of the tube sections and a common electrode is positioned either within the tube or on the side opposite the plurality of individual electrodes. The common electrode is arranged so as not to obstruct to any appreciable extent the light produced within the tube. Each individual exterior electrode is insulated from each of the others, thus permitting the energization of any desired one independently of the others in order to confine the light emission to a single properly positioned electrode. The use of a high frequency current enables a glow to be produced within the tube, the amount of glow being dependent upon the amplitude of the high frequency current which has been modulated as to amplitude by the incoming picture current. Provision is made to control the maximum and minimum peak values of the modulated high frequency waves, in order to produce the proper voltage for the lamp and to control the range between the lightest and darkest portions and the average tone value of the produced image. A separate source of high frequency current is connected to cause a continuous discharge between the common electrode of the lamp and the end elements of each of the several tube sections which go to make up a completed lamp. The maintenance of such a discharge facilitates the building up and control of the several discharges in the neighborhood of the several individual electrodes. A feature of this arrangement is the simplicity of connection through spring contacts between the electrodes of the lamp and the mounting frame.

A more detailed description of the invention follows and is illustrated in the accompany drawings.

Fig. 1 is a schematic representation of a television system showing the electrical and mechanical terminal elements selected for illustrating this invention.

Fig. 3 is a partial detailed rear view of a grid type multiple electrode glow discharge lamp showing several of the interconnected tube sections, the common interior electrodes, the individual exterior electrodes, the common exterior electrode used for continuous energization of each of the tube sections, the supporting members for the tubes, and the gas purifying chamber.

Figure 2:
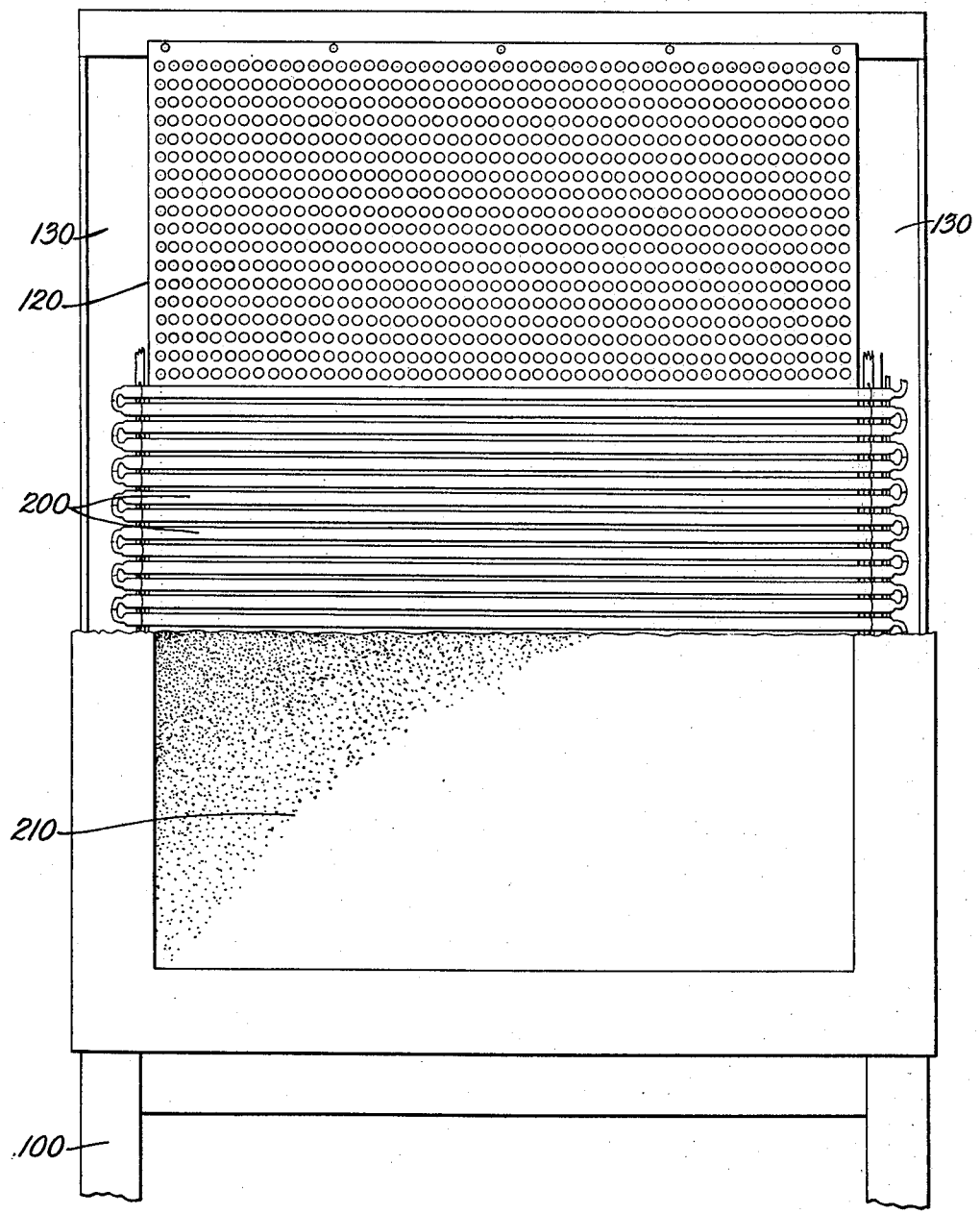
Fig. 2 is a front view of the picture receiving apparatus, parts of which are cut away, showing the picture receiving ground glass viewing screen, the grid type multiple electrode glow discharge lamp, and the multiple contact panel for making connection with the individual electrodes on the lamp.

The terminal equipment includes suitable transmitting apparatus for illuminating and scanning the object and for translating the light tone values of the object into electric current variations, amplifying these currents and impressing them on the transmission circuit over which they are transmitted to the receiving apparatus which includes apparatus for amplifying, controlling and combining the incoming picture current with a high frequency current and synchronously operated distributor commutating apparatus for properly impressing the high frequency modulated currents upon a multiple electrode receiving lamp and such a lamp with an associated viewing screen, the principal elements of which are diagrammatically shown in Fig. 1.

At the transmitting station the scanning apparatus includes a powerful light source 20 whose light is directed by means of lenses 21 upon the scanning area of the scanning disc 22. The light upon passing through any one of the apertures in the scanning disc passes through the apertured screen 23, whose opening bounds the field of view, and a lens 24 to the object 25 whose image is transmitted. The scanning disc 22 is operated in synchronism with the receiving apparatus. As the scanning disc is rotated it causes a small beam of intense light passing successively through each one of its apertures to scan in a series of parallel paths the object whose image is to be transmitted, and reflected light from each elemental area of the object is successively impressed upon a light sensitive translating device 30 thereby setting up current variations in accordance with the light tone values of the elemental areas of the object. Further details of a suitable scanning and light translating arrangement of this type are shown in the copending application of Frank Gray, Serial No. 181,538, filed April 6, 1927. A suitable synchronizing system is disclosed in a copending application of H. M. Stoller and E. R. Morton, Serial No. 181,314, filed April 6, 1927.

The current from the light sensitive device 30 is amplified by the amplifying apparatus 31 and impressed through the repeating coil 41 upon the transmission line 40. The transmitted current is an alternating current of varying amplitude representative of light variations above and below the average tone of the object being scanned. The advantages of employing current of this kind and further details of apparatus for its production are disclosed in a copending application of H. E. Ives and Frank Gray, Serial No. 181,511, filed April 6, 1927.

The incoming alternating signaling current received from the transmission line is impressed upon the input circuit of receiving amplifier 50 by repeating coil 42. The amplified alternating current from amplifier 50 is then impressed upon the input circuit of amplifier 60 through gain control potentiometer 52 and condenser 53. The output current of amplifier 60 is impressed through condenser 61 upon the oscillator-modulator O—M—70, the modulated output energy of which is imposed through the variable coupling 80 and a synchronously operated distributor commutator upon the multiple electrode glow discharge lamp 200. An oscillator-modulator of the type disclosed in R. A. Heising Patent No. 1,442,146, issued January 16, 1923, designed to produce a high frequency wave of the order of a million cycles per second, may be used for the oscillator-modulator O—M—70.

The synchronizing apparatus, the distributing commutator and the connected multiple electrode glow discharge lamp and the viewing screen are all diagrammatically represented in a plan view at the right of Fig. 1. The synchronizing motors 101 and 102 drive the rotating brush 111 of the distributor commutator 110. The distributor commutator contains one contact for each element or individual electrode of the glow discharge lamp and connection is made between them by individual wires, and corresponding connections through a multiple contact panel 120 having an individual spring-connecting contact for each lead wire from the distributor commutator to the individual electrode on the glow discharge lamp. One of the horizontal sections of the glow discharge lamp 200 is shown in this drawing. A ground glass viewing screen 210 may be positioned in front of the glow discharge lamp.

The electrical circuit for the picture producing current flowing through the glow discharge lamp is from an individual electrode on the lamp, each of which connects with the distributor commutator, to the common electrode of the lamp. Modulated high frequency current representative of the picture variations from the oscillator-modulator apparatus O—M—70 is impressed upon the glow discharge lamp through the conductor 81 connecting with the brush 111 of the distributor commutator, the contacts of which in turn connect with individual electrodes of the glow discharge lamp, and through the conductor 82, connecting with the common electrode 204 of the lamp. In the operation of this circuit the coupling 80 may be adjusted to give a suitable average tone value for the picture; and the light and dark variations of the picture from this average tone value may then be controlled by the degree of modulation impressed on the high frequency current. The latter adjustment may be made by controlling the strength of the incoming picture current by means of the potentiometer 52. A further connection for high frequency current is made through a special set of electrodes 205 associated with each section of the glow discharge lamp through the conductor 83, the purpose of which is to provide means for continuously exciting the lamp in a way to prevent lag in the action of the current applied to the individual electrodes of the lamp. This second high frequency current may be supplied from a high frequency oscillator 90 supplying current at a frequency of the order of one and a half million cycles per second. The response of a glow discharge lamp is much more sensitive in starting and to small current variations if the lamp is already under excitation when the signaling current is impressed thereon, and this fact is taken advantage of by continuously exciting the tube through a special set of electrodes so arranged as to avoid interferring with the luminosity of the viewing screen.

Figure 7:
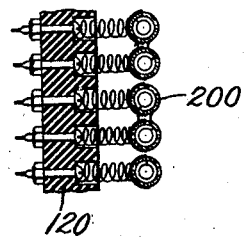
Fig. 7 is a cross section of a small portion of the multiple contact panel showing the spring contacts for engaging the several individual exterior electrodes of the glow discharge lamp.

A front view of the picture receiving apparatus, parts of which are cut away, showing the picture receiving or viewing screen, the multiple electrode glow discharge lamp, and the multiple contact panel for making connection with the individual electrodes on the lamp is shown in Fig. 2. This apparatus is mounted upon a suitable framework 100. A large panel of ground glass forms the picture receiving or viewing screen 210. This is preferably omitted when the audience is at a considerable distance from the viewing lamp. Immediately to its rear is positioned the multiple electrode glow discharge lamp 200. This lamp, which will be described more in detail later, consists of a plurality of tubular sections interconnecting at their ends so as to form one continuous chamber. Each section carries a large number of individual exterior electrodes, each of which represents an elemental area of a picture and is caused to emit light of the proper intensity. The arrangement is such that the electrodes divide up the area behind the ground glass picture viewing screen into a large number of uniform areas equally spaced. To the rear of the glow discharge lamp the multiple contact panel 120 is so positioned that each electrode of the lamp makes contact with a corresponding spring connector in the contact panel, the details of which are shown in Fig. 7. Electrical shielding 130 lines portions of the housing around the glow discharge lamp.

A detailed rear view of the glow discharge lamp 200 is shown in Fig. 3. The gas containing chamber is composed of a plurality of glass tubes closely positioned parallel to each other in a flat grid-like formation and connected in series with each other at their ends. This arrangement forms a continuous chamber in which the gas pressure is the same throughout and one which may cover a large area and at the same time stand atmospheric pressure without making the walls of the chamber unduly thick. The various sections of the tube are fastened by a lacing or other suitable means to the left and right supporting members 210 and 211. These supports form a part of a frame which is arranged to fit into the supporting member 100 shown in Fig. 2 so as to connect the lamp with its electrical circuits in position for operation. Each tube section 201 has an internal common electrode 202 which may be in the form of an open spiral extending throughout the length of a section, and a plurality of spaced individual exterior electrodes 203 fixed along the exterior rear side of the tube sections. These exterior electrodes may be made of tinfoil or other suitable conducting material cemented to the tube, and they extend circumferentially about 180 degrees, and longitudinally along the tube a length about equal the diameter of the tube, and thus have a front or projected area which may be square. Each electrode is separated to insulate it from the adjoining electrodes by a distance which may be a small fraction of its length. The adjoining sections of the tube are positioned in such proximity with each other that the exterior individual electrodes appear uniformly spaced throughout the entire area covered by the tube. The interior common electrode of each tube section is brought out at one end through a seal and connected to a common conductor 204. A special set of exterior electrodes 205 associated with all of the tube sections forms a connection common to all. This connection is used for continuously energizing each section of the tube by passing a high frequency oscillating current of the order of one and a half million cycles per second across it and the interior common electrodes 202 of each section so as to maintain a condition of excitation of the tube which substantially eliminates lag in the response of the tube when the individual exterior electrodes are energized by the signal currents.

A gas purifying chamber 212 is attached to the tube. This purifying chamber contains two small electrodes 213 and 214 made of such material as pure magnesium. They are connected to a suitable source of electric current by leads sealed through the sides of the chamber. If a direct current voltage of the order of 150 volts is applied across these terminals, a discharge will be set up which causes purification of the gas within the lamp chamber in well-known manner.

Figure 4:
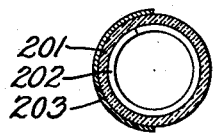
Fig. 4 is a cross-section of one of the tubes of the glow discharge lamp.

A cross-section of one of the tubular sections of the lamp is shown in Fig. 4. The relative positions of the common internal electrode 202, the walls of the tube sections 201 and the individual electrodes 203 are clearly shown in this drawing.

Figure 5:
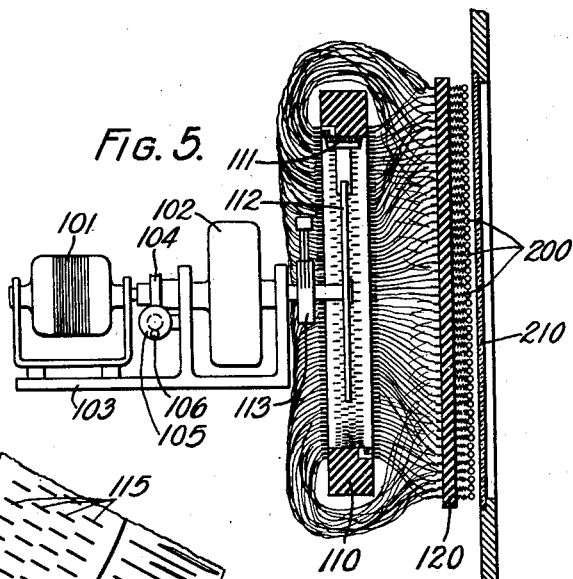
Fig. 5 is a side elevation and partial cross-section of the picture receiving equipment comprising the synchronizing motors, the distributor commutator, the multiple contact panel, the multiple electrode glow discharge lamp, and the ground glass picture receiving screen.

The driving and synchronizing elements, the distributor commutator, and the multiple contact panel for making connections with the individual electrodes on the glow discharge lamp are particularly shown in Fig. 5. A low frequency synchronizing motor 101 is directly connected with the high frequency synchronizing motor 102 for synchronously operating the brush of the distributor commutator and both of these units are mounted in a suitable cradle base 103 so that the field frame of each may be simultaneously rotated through a part of a revolution for the purpose of "framing" the picture. This is accomplished by means of the worm gear 104 attached to the field frame of both units and which engages the worm 105 mounted in suitable bearings attached to the base 103. Upon turning the worm 105 in one direction or the other by means of the operating arm 106 the angular position of the fields of the motors 101 and 102 may be simultaneously moved into any angular position and thus their armatures caused to take at any instant the desired angular position necessary to position the brush 111 in phase with the scanning apparatus at the transmitting station and consequently frame the received picture by making connection through the proper contact in the distributor commutator 110. The disc 112 carrying the distributor commutator brush 111, and also a slip ring connection 113 through which the high frequency signaling current is transmitted to the various individual electrodes of the glow discharge lamp is fixed upon the common shaft of these units. This driving and synchronizing arrangement is of the type shown in the copending application of Stoller and Morton, supra, while the arrangement for framing the picture is disclosed in the copending application of H. E. Ives and Frank Gray, supra.

In a system of this type the glow discharge lamp may have a plurality of elemental glow or light emitting areas running into the thousands, and this necessitates the distributor commutator making an equal number of individual connections in each cycle of its operation. The arrangement here shown employs one commutator and in order to have sufficient space for the contacts without making the diameter of the commutator unduly large four rings are used, positioned in parallel planes adjoining one another and having the contacts angularly displaced so that the brush engages only one contact at any instant. It is also desirable to have a reasonable amount of spacing between the contacts and their terminals to provide satisfactory electrical insulation and room to connect the lead wires thereto.

Figure 6:
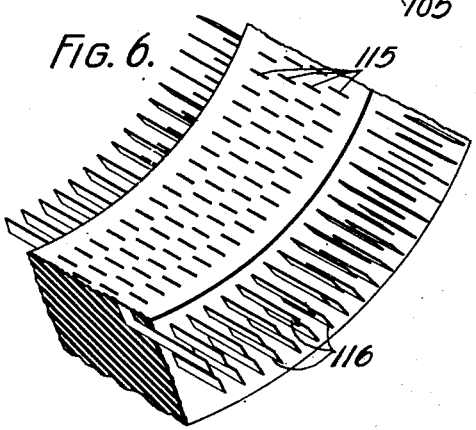
Fig. 6 is a section of a distributor commutator showing the arrangement of the contacts.

The arrangement of the distributor commutator contacts is shown somewhat more clearly in Fig. 6. Four rings of contacts are shown, and all rings are substantially the same. Terminal connections 116 for attaching leads to the commutator contacts 115 in the two rings or sections at the left are brought out at the left side, and those for the two rings or sections at the right are brought out at the right side so as to give as much spacing as practical. These terminals, however, could be brought out radially from the external periphery of the rings and such a procedure might be used especially where a large number of rings were positioned side by side.

The multiple contact panel 120, a side view of which is shown in Fig. 5, consists of insulating material of suitable thickness and having an area somewhat larger than the area covered by the individual electrodes on the glow discharge lamp. This panel carries one spring connector contact positioned to connect with each exterior electrode on the glow discharge lamp. Each of the spring connectors is fixed to a stud passing through the insulating material and having a terminal at the rear side of the contact panel for connection to a lead from the distributor commutator. A fragmentary cross-section of a portion of the contact panel 120 and details of these spring contacts and their terminals is shown in Fig. 7 which is self-explanatory. Several adjacent sections of the glow discharge lamp 200 are shown in the position of engagement with the spring connecting contacts.

Figure 8:
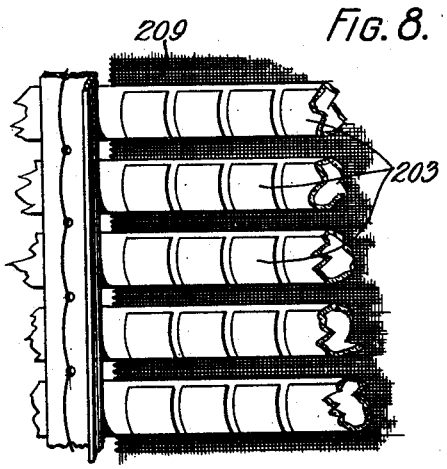
Fig. 8 is a modification of the arrangement of the electrodes of the glow discharge lamp in which the common electrode, as well as the individual electrodes, is positioned outside of the lamp chamber.

A modification of the arrangement of electrodes of the glow discharge lamp to position the common as well as the individual electrodes on the outside of the tube is shown in Fig. 8. The gas containing chamber and the individual exterior electrodes 203 are here arranged the same as shown in Fig. 3, but the common electrode 209 instead of being positioned within the tube sections is positioned on their exterior opposite to the individual electrodes. Such a common exterior electrode may be in the form of an open wire mesh or gauze of conducting material which permits the passage of light. It is arranged to be in close relation to the front side of the tube sections.

What is claimed is:

1. In an electro-optical image producing system, a source of voltage having variations characteristic of the image to be produced, a lamp having a glow discharge chamber, and means for substantially continuously impressing upon at least a portion of said chamber a high frequency of substantially constant energy.

2. In a television system, a source of image current having characteristics representative of the image to be produced at the receiver, a source of high frequency energy, means to modulate high frequency energy from said high frequency source in accordance with current from said source of image current, and a receiving lamp energized by said modulated energy.

3. In an electro-optical image producing system, a source of voltage having variations characteristic of the image to be produced, and a glow discharge receiving lamp comprising a chamber containing a gas at a low pressure, a plurality of electrodes so associated with said chamber and gas contained therein that electrical stresses are set up between electrodes of opposite polarity through the wall of the said chamber and cause the gas in the immediate vicinity of the energized electrode to luminesce, and means for applying high frequency electrical oscillations representative of said voltage variations to the electrodes to be energized.

4. In an electro-optical image producing system, a source of voltage characteristic of the image to be produced, and a glow discharge lamp having a transparent chamber containing gas which emits light upon being electrically excited, a plurality of small electrodes on the exterior surface of said chamber, a common electrode within said chamber, a source of high frequency oscillations representative of said voltage variations, and means for impressing said high frequency oscillations from said source across the said common electrode and any one of said exterior electrodes.

5. In a television system, a source of picture current having characteristics representative of the image to be produced at the receiver, a source of high frequency energy at the receiver, means to modulate the high frequency energy from said high frequency source in accordance with current from said source of picture current, a receiving lamp having a number of sections each having a plurality of electrodes, one electrode for each elemental area of an image to be produced at the receiver successively energized by said modulated energy, and end element electrodes for the different sections of the receiving lamp continuously energized for reducing lag in the production of luminosity by the modulated energy.

6. In an electro-optical system, a glow discharge lamp having a transparent chamber containing gas which emits light upon being electrically excited, a plurality of small electrodes on the exterior surface of said chamber, a common electrode within said chamber, a source of high frequency current representative of a signal, and means for impressing said high frequency current continuously across part of said exterior electrodes and the said common electrode and successively in a pre-arranged sequence with respect to said exterior electrodes.

7. A glow discharge lamp having a transparent chamber containing gas which emits light upon being electrically excited, a plurality of small electrodes on the exterior surface of said chamber, a common electrode within said chamber, a source of high frequency current, a source of signal current, means for modulating said high frequency current by said signal current, means for impressing in a prearranged sequence the modulated high frequency current across said exterior electrodes and the said common electrode, and means for continuously impressing high frequency current unmodulated across part of said exterior electrodes and the said common electrode.

8. A glow discharge lamp having a transparent chamber containing gas which emits light upon being electrically excited, a plurality of small electrodes on the exterior surface of said chamber, a common electrode within said chamber, a source of high frequency current, a source of signaling current, means for modulating said high frequency current by said signaling current, means for impressing in a prearranged sequence the modulated high frequency current across said exterior electrodes and said common electrode, a second source of high frequency current, and means for impressing the high frequency current from the said second source continuously across a part of the said exterior electrodes and the said common electrode.

9. An image producing system comprising a source of carrier current at a receiving station, means at said station for modulating current from said source in accordance with the received image impulses, and light producing means controlled by said modulated current.

10. An image producing system comprising a source of carrier current at a receiving station, means at said station for modulating current from said source in accordance with received image impulses, light producing means controlled by said modulated current, and means for simultaneously impressing alternating current of constant value upon said light producing means.

11. An image producing system comprising a source of carrier current at a receiving station, means at said station for modulating current from said source in accordance with received image impulses, a glow discharge lamp controlled by said modulated current, and means for simultaneously impressing alternating current of a steady value upon said lamp.

12. In an electro-optical system, the combination with a glow discharge lamp comprising a vessel having an electrically insulating wall and containing gas, and means for setting up a glow discharge in said gas comprising electrodes in part at least external to said wall, and means for simultaneously impressing upon said lamp variable voltage impulses and a steady alternating voltage to energize said lamp through said wall.

13. In an image producing system, the combination with a glow discharge lamp comprising a vessel having an electrically insulating wall and containing a gas, and having electrodes in part at least external to said wall, of a source of carrier voltage modulated in accordance with image impulses, a source of alternating voltage of steady value, and means for simultaneously impressing both of said voltages upon said lamp to energize said lamp through said wall.

14. An electro-optical system comprising a glow discharge lamp having spaced electrodes the electrical capacity between which is small, and means for impressing an alternating signal modulated voltage upon said electrodes of a frequency of at least the order of one million cycles per second.

15. A television system comprising a glow discharge lamp having a vessel with a dielectric wall and electrodes at least one of which is external to said vessel whereby no current can flow between said electrodes and the electrical capacity of the lamp is small, and means for impressing an alternating signal modulated voltage upon said electrodes of such high frequency that the capacitative reactance of said lamp thereto is small.

16. An electro-optical image producing system comprising light producing means for producing light in succession over the elemental portions of the image field, a source of alternating carrier current modulated in accordance with the light tone values of elemental portions of the field at the transmitter and distributing means for directing and applying said current to different portions of said light producing means in succession.

17. The method of operating a glow discharge lamp which comprises impressing thereon varying operating voltages and simultaneously impressing thereon, a steady alternating voltage to cause the lamp to respond more readily to the operating voltages without much affecting the average luminosity produced by the operating voltages.

18. In an image producing system, a discharge lamp for supplying light for the production of the image, means at the same station as the lamp for constantly generating and impressing thereon a high frequency current, and means for causing incoming signal current representing a dark condition at the transmitter to change the amplitude of said current in one direction and image currents representing a light condition to change the amplitude of said current in the other direction.

19. An image producing system as in claim 18 having means for adjusting the value of said alternating current supplied to said lamp to adjust the average tone value of the image.

20. An image producing system comprising a lamp for supplying light for the production of the image, means at the same station as said lamp for producing and impressing thereon a high frequency alternating current, means for causing incoming image currents representing a dark condition at the transmitter to change the amplitude of said alternating current in one direction and the image currents representing a light condition to change said alternating current in the opposite direction, means for adjusting the amplitude of said alternating current supplied to said lamp to vary the average tone value of the image, and means for adjusting the amount of change of amplitude of said alternating current by a given value of incoming image current.

In witness whereof, I hereunto subscribe my name this 5th day of April, A. D. 1927.

FRANK GRAY.

DISCLAIMER 1,759,504.—*Frank Gray*, New York, N. Y. ELECTROOPTICAL TRANSMISSION. Patent dated May 20, 1930. Disclaimer filed October 14, 1931, by the assignee, *Bell Telephone Laboratories, Incorporated*.

Hereby enters this disclaimer to the said claim of said Letters Patent which is in the following words—to wit:

"9. An image producing system comprising a source of carrier current at a receiving station, means at said station for modulating current from said source in accordance with the received image impulses, and light producing means controlled by said modulated current."

[*Official Gazette November 3, 1931.*]